A. M. TAYLOR.
NAIL FEEDING DEVICE.
APPLICATION FILED JAN. 4, 1907.
987,331.
Patented Mar. 21, 1911.
Fig. I
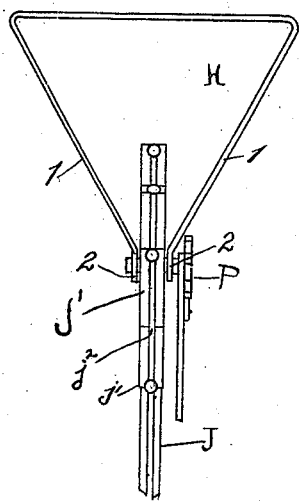
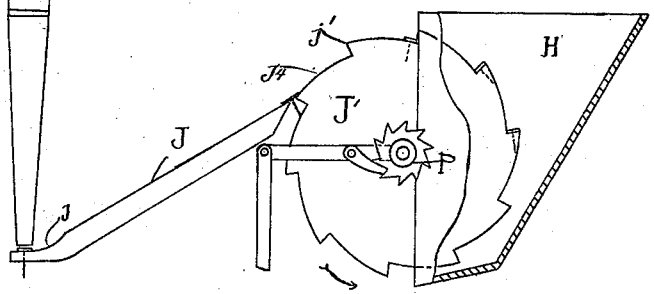
Fig. II
WITNESSES
A. A. Boelke.
W. F. Donnelly.
INVENTOR
Arthur M Taylor
by
W. E. Donnelly
Atty.

UNITED STATES PATENT OFFICE.

ARTHUR M. TAYLOR, OF KEUKA PARK, NEW YORK, ASSIGNOR TO THE TAYLOR BASKET AND MACHINE COMPANY, OF ERIE, PENNSYLVANIA, A CORPORATION OF NEW YORK.

NAIL-FEEDING DEVICE.

987,331.  Specification of Letters Patent.  Patented Mar. 21, 1911.

Application filed January 4, 1907. Serial No. 350,766.

*To all whom it may concern:*

Be it known that I, ARTHUR M. TAYLOR, a citizen of the United States, residing at Keuka Park, in the county of Yates and State of New York, have invented certain new and useful Improvements in Nail-Feeding Devices; and I do hereby declare the following to be a full, clear, and exact description of the invention, such as will enable others skilled in the art to which it pertains to make and use the same.

My invention relates to tack or nail feeding devices and is especially designed for use in connection with basket nailing machines, its general object being the provision of a means for intermittently supplying a feed tube with nails and tacks from a containing hopper. For the accomplishment of this object, I have provided a nail feeding device consisting of a hopper and a revolving disk projecting therein, means provided upon said disk adapted to catch and retain a tack or nail in suspended position, the disk being formed of two portions suitably spaced apart and adapted to accommodate a nail or tack therebetween and the entire device being adapted to intermittently feed nails and tacks to a feed tube.

My invention further consists in parts and combinations of parts, all of which will be hereinafter fully set forth and claimed.

In the drawings Figure I, is a top plan view of a machine formed according to my invention, showing the disk in relation to the hopper and also the pawl and ratchet arrangement. Fig. II is a view in side elevation of my machine illustrating the disk in the act of delivering a tack to the feeder tube and the relation of the hammer to the disk and tube.

As the feeder hopper and the feeder tube are the principal elements of this invention, it will be seen that the said elements may be employed in various types of machines of a similar nature.

In the drawings I have illustrated a feeder which consists of an intermittently revoluble disk J′ formed with projections $j'$, the face of each projection being adapted to receive the head of a single nail or tack, and revolving in the direction indicated by the arrow.

A containing hopper H, is provided having a triangular-shaped open top and the disk J′ is mounted in a suitable bearing in the hopper and revolves half in, and half out of said hopper H. Said bearing is positioned approximately midway between the top and bottom of the hopper in a continuation of the sides 1 thereof suitably prolonged as at 2 forming parallel supports therefor, that corner of the hopper being suitably cut away for the reception of the disk J′.

The hopper H is supplied with a sufficient quantity of tacks or nails of the required type.

The disk J′ is preferably formed of two portions, leaving a space between the two which is sufficiently wide to receive the shank of a nail or tack and to allow the shank of a nail or tack to slide within it. Said space designated as $j^2$ being sufficiently narrow to prevent the heads of the nails or tacks from passing through it. This however is only one method of construction and other means may be employed, as, instead of employing two separate disks, a single plate may be employed, the same being grooved upon its periphery, toward the axis, of sufficient depth so that the heads of the tacks or nails will rest upon the periphery of the feeder.

In the construction shown the projections or prongs $j'$ revolve from the bottom upward through the hopper and receive in their transit a nail or tack, the head resting upon the projection $j'$ and the shank depending within the space $j^2$. As the feeder J′ revolves the tack or nail thus caught is carried upward and out of the hopper, through a cut-away portion of said hopper, and after it has passed over the vertical center line, the tack drops downward upon the portion $j^4$. The further revolution of the disk J′ brings the tack in close juxtaposition to the feeder-tube or slide J, depositing the tack upon the upper end of said tube or slide, from whence it slides downwardly to the end portion as at $j$, to be acted upon by the magnetic hammer F.

It will be clearly seen that each of the projections $j'$ will act in a like manner, and in order to cause this feeder J′ to act in conjunction with a nailing machine, I provide the same with a pawl and ratchet arrangement P adapted to coöperate with the magnetic hammer F of the nailing machine, thus obviating the employment of an escapement.

Inasmuch as this invention is not limited in its application to any special type of machine, any number of projections or catchers may be employed of any type, providing they first catch a tack or nail within the hopper H, carry it through the mass of tacks or nails in said hopper, upward and over the vertical line taken through the axis of the feeder disk, and feed it to the feeding tube or slide.

I have found that by this method of feeding the tacks or nails that all headless nails or tacks will slip through the catchers or prongs j' of the feeder, and that it obviates the use of an extra tube and extra labor employed to fill the tube with tacks. Inasmuch as the hopper may be filled with tacks in bulk and they are automatically fed to the tube, it will be seen that there is a great saving of time and labor.

In setting forth this invention I have shown and described certain constructions and details of construction, but it is obvious that the feeder may be modified in its construction without departing from my invention.

What I claim is:—

1. A tack or nail feeding device comprising a hopper; a raceway leading from said hopper; a disk arranged in the hopper, said disk having a circumferential groove in its face, and being provided with serrations, the top of the disk extending above the raceway, and the periphery of the disk being adjacent to the raceway; means for rotating the disk in a direction giving the top of the disk a direction toward the raceway, whereby the tacks or nails are picked up by the disk and carried thereby over the top of the disk and delivered to the raceway on the downward movement of that part of the disk carrying the tacks.

2. A tack or nail feeding device comprising a hopper; a raceway leading from said hopper; a disk arranged in the hopper, said disk having a circumferential groove in its face, and being provided with serrations, the top of the disk extending above the raceway, and the periphery of the disk being adjacent to the raceway; means for intermittently rotating the disk in a direction giving the top of the disk a direction toward the raceway, whereby the tacks or nails are picked up by the disk and carried thereby over the top of the disk and delivered to the raceway on the downward movement of that part of the disk carrying the tacks.

Signed at Keuka Park in the county of Yates and State of New York, this 26th day of December 1906.

ARTHUR M. TAYLOR.

Witnesses:
  CORA J. BARRUS,
  R. M. BARRUS.